(12) United States Patent
Buckley et al.

(10) Patent No.: US 6,798,530 B1
(45) Date of Patent: Sep. 28, 2004

(54) SYSTEMS, METHODS AND GRAPHICAL USER INTERFACES FOR PRINTING OBJECT OPTIMIZED IMAGES USING VIRTUAL PRINTERS

(75) Inventors: Robert R. Buckley, Rochester, NY (US); John C. Handley, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/455,780

(22) Filed: Dec. 7, 1999

(51) Int. Cl.[7] .......................... G06F 15/00; G06F 13/00
(52) U.S. Cl. ...................... 358/1.13; 358/1.15; 358/1.1; 719/321; 719/322; 719/323; 719/324; 719/325; 719/326; 719/327
(58) Field of Search .............................. 358/1.15, 1.13, 358/1.18, 1.1; 719/321–327

(56) References Cited

U.S. PATENT DOCUMENTS

| | | | |
|---|---|---|---|
| 5,371,837 A | * 12/1994 | Kimber et al. ............. | 358/1.15 |
| 5,579,446 A | 11/1996 | Naik et al. | |
| 5,687,303 A | 11/1997 | Motamed et al. | |
| 5,689,718 A | * 11/1997 | Sakurai et al. ............. | 715/517 |
| 5,704,021 A | * 12/1997 | Smith et al. ................ | 358/1.9 |
| 5,731,823 A | 3/1998 | Miller et al. | |
| 5,781,713 A | * 7/1998 | Yamada ..................... | 358/1.18 |
| 6,084,688 A | * 7/2000 | Stumbo et al. ............ | 358/1.17 |
| 6,149,323 A | * 11/2000 | Shima ........................ | 400/76 |
| 6,184,998 B1 | * 2/2001 | Tebeka ...................... | 358/1.15 |
| 6,515,756 B1 | * 2/2003 | Mastie et al. .............. | 358/1.15 |
| 6,542,252 B2 | * 4/2003 | Brossman et al. ......... | 358/1.13 |
| 6,552,813 B2 | * 4/2003 | Yacoub ...................... | 358/1.1 |
| 6,606,165 B1 | * 8/2003 | Barry et al. ................ | 358/1.9 |

OTHER PUBLICATIONS

International Business Machine, System Performance Modeling enhancements to virtual architure, Kenneth Mason Publication Ltd., Research Disclosure Database No. 436145.*

* cited by examiner

*Primary Examiner*—Edward Coles
*Assistant Examiner*—Alan Rahimi
(74) *Attorney, Agent, or Firm*—Oliff & Berridge, PLC (57) ABSTRACT

Rather than implementing a printer as a single set of rendering parameters, a printer can be implemented as a "meta-printer" that comprises one or more virtual printers. The virtual printers define different sets of rendering parameters. Each virtual printer is accessed through a page description language or through a user interface presiding in a print driver or server. In particular, each virtual printer of the meta-printer has an associated set of rendering parameters. One virtual printer of this meta-printer may be set up to print a first type of content using a first set of selected rendering parameters. This same virtual printer may be set up to print a different type of content using a different set of selected rendering parameters. This may be repeated for any number of additional content types. A user can access these virtual printers to print a document containing a variety of different content types. A user may select one virtual printer of the meta-printer to render an entire document. In this case, if the selected virtual printer defines only a single selected rendering parameter option for each rendering parameter, that rendering parameter option will be used to render all of the different various content types in that document. In contrast, if the selected virtual printer defines different selected rendering parameter options for different content types for various rendering parameters, the different content types will be rendered differently using the particular rendering parameter options selected for each content type.

24 Claims, 6 Drawing Sheets

SYSTEMS, METHODS AND GRAPHICAL USER INTERFACES FOR PRINTING OBJECT OPTIMIZED IMAGES USING VIRTUAL PRINTERS

BACKGROUND OF THE INVENTION

1. Field of Invention

This invention is directed to systems, methods and graphical user interfaces that enable object optimized printing of different types of image objects.

2. Background of the Invention

As color printers, including color ink jet printers, color laser printers and digital color copiers and the like, have become more sophisticated, users of such color printers have required more sophisticated rendering of the various portions of mixed content images. Such mixed content images can include text portions, graphics portions and photograph portions.

Prior to the advent of high quality computer generated page images, page images, such as those found in newspapers, newsletters, magazines and the like, were formed by graphic artists composing the page images by hand. Thus, in such hand-composed page images, each different type of object on a page image such as text, photographs, constant color areas or graphs such as pie charts, and sampled or continuously changing images such as sweeps, was optimally formed independently of any other type of object.

Because these page images were composed by hand, each type of object was inherently treated independently of the other objects. Thus, for example, the optimal halftone screen design for photographs, which differs from the optimal halftone screen designs for constant color areas and text, could be selected and the selected screen arranged to an optimal angle.

Initially, color printers, such as color ink jet printers, rendered each document with a unitary set of rendering techniques. Thus, a single halftone screen was applied to each of the different types of image areas in a page, including the text areas, the photographic areas, the sampled image areas and the constant color areas, regardless of whether that halftone screen was appropriate for that image area. This was true for any other rendering parameter, such as the color settings, the gamut settings, the type of compression used, and the like.

U.S. Pat. No. 5,687,303 to Motamed et, al, incorporated herein by reference in its entirety, discloses systems and methods for treating each object of an electronic document independently of the other objects. Thus, the appropriate rendering parameter options could be selected for each different type of object and applied to each different type of object independently of the parameters selected for the other types of objects. U.S. Pat. No. 5,579,446 to Naik et al. and U.S. Pat. No. 5,704,021 to Smith et al. disclose various graphical user interfaces that allow different color control options and different halftoning techniques to be independently applied to text objects, graphics objects and photo objects. In particular, in the 446 and 021 disclosure, the user has the option of manually selecting the rendering options or allowing the system to apply default rendering options to each different type of object.

SUMMARY OF THE INVENTION

However, the systems and graphical user interfaces disclosed in the 446 and 021 patents set the rendering parameter options independently of a particular document. Thus, if the user wishes to have a particular set of rendering parameter options applied to a particular document, before printing that document, the user must go to the manual color options graphical user interface of the 446 and 021 patents and select the desired rendering parameter options. The user can then print that document, and any following documents, using the selected set of rendering parameter options.

Then, if the user wishes to print a document using a different set of rendering parameter options, the user must once again open the manual color options graphical user interface and change the selected rendering parameter options before printing the new document. Moreover, if the user wishes to print the previous document or another document requiring the previously selected set of rendering parameter options, the user must once again open the manual color option graphical user interface and change the selected rendering parameter options back to the previously selected set of rendering parameter options.

The graphical user interface shown in the 446 and 021 patent provides only two different rendering parameters, and only three different options for each different rendering parameter, for only three different types of object. However, printers and printer drivers have become more sophisticated, such that an increased number of rendering parameters, an increased number of options within each parameter, and an increased number of different types of objects have been enabled. Accordingly, setting up the particular desired set of rendering parameter options for a particular document has become increasingly cumbersome.

Thus, if the user has a number of different documents requiring different sets of rendering parameter options, the user must either carefully plan when to print those documents requiring the same or similar color options to minimize the number of times the rendering parameter options are changed. Alternatively, the user must continually access the manual color options graphical user interface to change the selected rendering parameter options to those appropriate for the current document. For sophisticated users having large print jobs, this is inefficient and frustrating.

Accordingly, this invention provides systems and methods that allow sets of selected rendering options to be associated with different virtual printers.

By allowing different sets of selected rendering options to be associated with a virtual printer, the user needs to select and set up the virtual printer only once. Then, to change the rendering options to be used to render a particular document and/or to render particular types of objects, the user merely needs to select the appropriate virtual printer or printers.

This invention separately provides systems, methods and graphical user interfaces that permit a user to define a virtual printer having a selected set of rendering options and to store that virtual printer for current or later use.

This invention separately provides systems, methods and graphical user interfaces that allow a user to select a particular virtual printer to be used to control the printing of a document on a physical printer.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following Figures wherein.

DETAILED DESCRIPTION OF PREFERRED EMBODIMENTS

Figure 1:
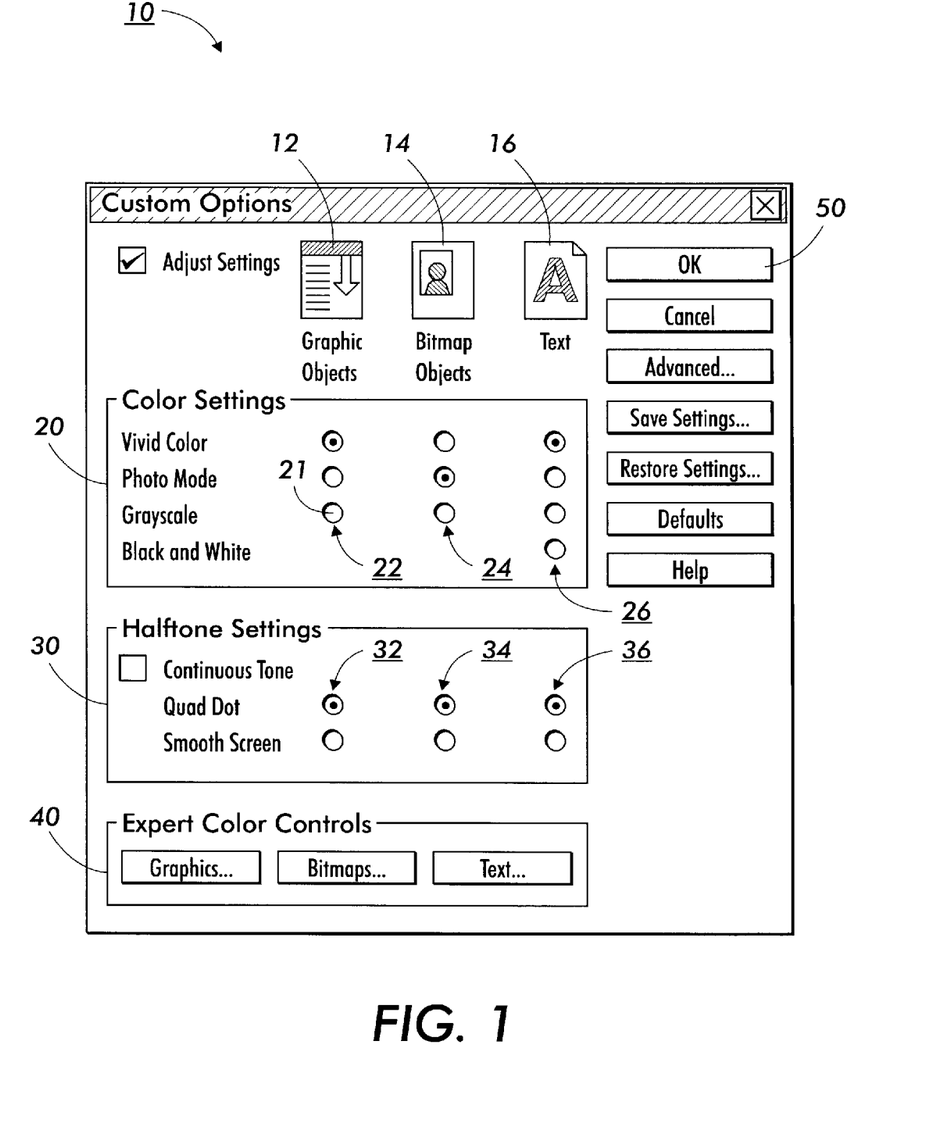
FIG. 1 is a conventional object oriented graphical user interface for selecting rendering options.

FIG. 1 is an exemplary embodiment of a manual color option graphical user interface as described in the 446 and 021 patents. In particular, as shown in FIG. 1, this conventional graphical user interface 10 defines three different type of image objects: graphical objects 12, bitmap objects 14 and text objects 16. The graphical user interface 10 includes a color setting parameter section 20, a halftone parameter setting section 30 and an expert color control portion 40. The color parameter setting portion 20 includes a first set 22 of radio buttons 21 for selecting the color parameter option for the graphical objects 12, a second set 24 of radio buttons 21 for selecting the color parameter option for the bitmap objects 14 and a third set 26 of radio buttons 21 for selecting the color parameter option for the text objects 16. As shown in FIG. 1, one set of selected color rendering parameter options can include using vivid color rendering parameters for the graphical objects 12, photo mode rendering parameters for the bitmap objects 14 and vivid color rendering parameters for the text objects 16. Similarly, the halftone parameter setting portion 30 includes three sets 32, 34 and 36 of radio buttons 21 for the graphical objects 12, the bitmap objects 14 and the text object 16, respectively. As shown in FIG. 1, one set of selected halftone rendering parameter options includes using the quad dot halftone rendering parameter for all of the different types of objects.

The expert color control portion 40 allows the user to control each of the selected options for the rendering parameters for each of the graphics objects 12, the bitmap objects 14 and the text objects 16 at a finer resolution.

As indicated above, once the user selects the different rendering parameter options for each of the available rendering parameters for each of the different types of objects, the user clicks the OK button 50 of the conventional manual color option graphical user interface 10 to begin printing documents using the selected rendering parameter options for the various rendering parameters. If the user needs to change the selected option for one or more of these rendering parameters, the user must once again access the manual color option graphical user interface 10, click on the appropriate radio button 21 for the appropriate rendering parameter option of the appropriate rendering parameter for the appropriate object, for each rendering parameter the user wishes to change. Once the user has finished changing the selected rendering parameter options, the user again clicks the OK button 50 and continues printing documents using the revised set of selected rendering parameter options.

Should the user wish to further revise the set of selected rendering parameter options, or to return to a set of previously selected rendering parameter options, the user must once again access the manual color option graphical user interface 10, and select the radio button 21 corresponding to the desired rendering parameter option for the desired rendering parameter for the desired type of object. Then, after all of the rendering parameter options have been either been updated or returned to their previous values, the user must select the OK button 50 to accept the revised rendering parameter options and to begin printing with those selected rendering parameter options.

In contrast, according to the systems, methods and graphical user interfaces of this invention, rather than implementing a printer as a single set of currently selected rendering parameter options, a printer can be implemented as a "meta-printer" that comprises one or more virtual printers. Each of these virtual printers can define a different set of rendering options or capabilities. Each virtual printer can be independently addressed using either or both of a page description language or a user interface presiding in a local print driver and/or on a print server. In particular, each of the virtual printers that comprise the meta-printer has an associated set of rendering methods, for example, a set of selected rendering parameter options. For example, one virtual printer of a meta-printer may be set up to print black and white images and/or objects using an error diffusion type halftoning technique. Another virtual printer of the same meta-printer may be set up to print four-color images and/or objects using gamut compression and a clustered-halftone-dot halftoning technique. Still another virtual printer of the same meta-printer may be set up to print four-color images and/or objects with gamut clipping and using a stochastic halftone-screen halftoning technique. Moreover, yet another virtual printer of this same meta-printer may be set up to print a first type of content, such as a graphical object, a bitmap object or a text object, using a first set of selected rendering parameter options. This same virtual printer may be set up to print a different type of content using a completely different set of selected rendering parameter options, and this may be repeated for any number of additional types of content.

Thus, in various exemplary embodiments of the systems, methods and graphical user interfaces according to this invention, a user can access these virtual printers in a variety of ways to print a document containing a variety of different object types. In particular, in various exemplary embodiments, a user may select one of the virtual printers of this meta-printer to render a particular document in its entirety. In this case, if the selected virtual printer defines only a single selected rendering parameter option for each rendering parameter, that rendering parameter option will be used to render all of the different various types of objects in the selected document. In contrast, if the selected virtual printer defines different selected rendering parameter options for different content types for one or more of the rendering parameters, the different types of content will be rendered differently using the particular rendering parameter options selected for each type of content.

In other exemplary embodiments of the systems, methods and graphical user interfaces of this invention, a user may select a different virtual printer for each different type of content. Thus, a first virtual printer may be selected for rendering all content of a first type, while a second virtual printer is selected to render all content of a second type, and so on.

Because each of the virtual printers defines a different set of selected rendering parameter options, and may define more than one such set of selected rendering parameter options, selecting one or more virtual printers to render a particular document allows the user to easily select a particular set of one or more virtual printers if that document, or a similar type of document, needs to be printed. That is, because the virtual printers persist in time, the user can define a set of desired rendering parameter options, and reuse that set of rendering parameter options by simply selecting the virtual printer or printers associated with that set of rendering parameter options. In this way, the user can avoid having to continually access the conventional manual color option graphical user interface 10 shown in FIG. 1 each time any one of the rendering parameter options for any one of the various types of implemented objects needs to be changed.

Figure 2:
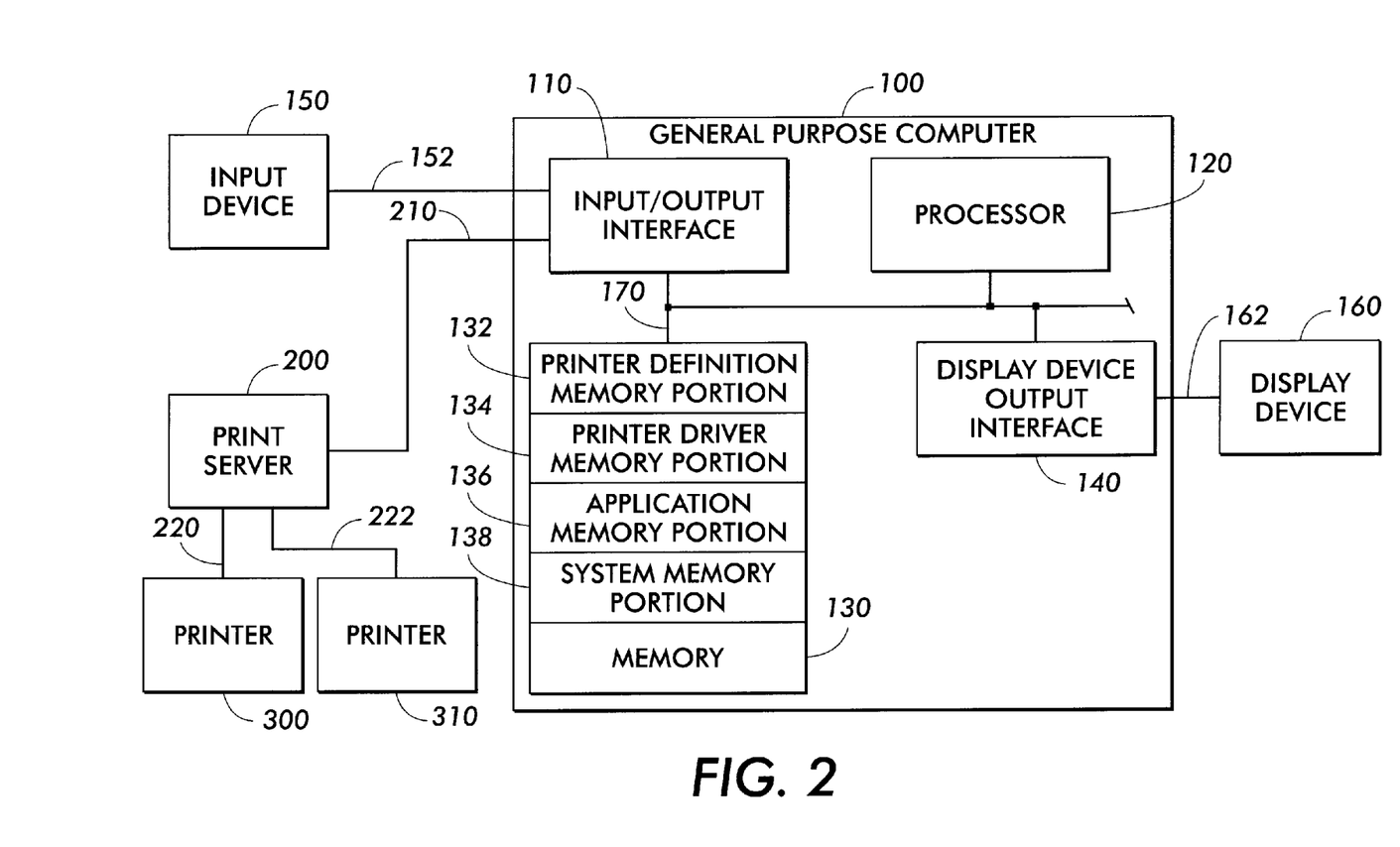
FIG. 2 is a block diagram of one exemplary embodiment of a system for printing object optimized images using virtual printers according to this invention.

FIG. 2 is a functional block diagram of a general purpose computer 100 on which the systems, methods and graphical user interfaces of this invention can be used. As shown in FIG. 2, the general purpose computer 100 includes an input/output interface 110, a processor 120, a memory 130 and a display device output interface 140, each connected to a data/control bus 170. The input/output interface 110 is connected to an input device 150 over a link 152. The input device 150 can be one or more of a keyboard, a mouse, a track ball, a track pad, a touch screen, or any other known or later developed device for inputting data and/or control signals to the general purpose computer 100. A display device 160 is connected over a link 162 to the display device output interface 140. The display device can be any known or later developed device that is capable of displaying the various graphical user interfaces according to this invention. Thus, the display device 160 can be a cathode ray tube-type monitor, a flat screen monitor, a luminescent LCD monitor, a touch screen, or the like.

The general purpose computer 100 is generally connected over a link 210 to a printer server 200. The printer server 200 is usually connected or connectable to a number of printers, such as the printers 300 and 310, which are connected over links 220 and 222 to the printer server 200.

Each of the various links 152, 162, 210, 220 and 222 can be any known or later developed device or system for connecting the input device 150 and/or the printer server 200 to the input/output interface 110, for connecting the display device 160 to the display device output interface 140, and for connecting the printers 300 and 310 to the print server 200. In particular, the links 152, 162, 210, 220 and 222 can be implemented as any one of a direct cable connection, a connection over a wide area network or a local area network, a connection over an intranet, a connection over an extranet, a connection over the Internet, a connection over any other distributed processing network or system, or an infrared or other wireless connection.

For example, the link 152 connecting the input device 150 to the input/output interface 110 and the link 162 connecting the display device 160 to the display device output interface 140 can be direct cable connections, while the links 210, 220 and 222 connecting the print server 200 to the input/output interface 110 and to the printers 300 and 310, can be different portions of a local area network or other distributed network. In this case, the print server 200 could also be incorporated directly into the general purpose computer 100.

However, it should be appreciated that either one of the printers 300 and 310 can be directly connected to the input/output interface 110. In this case, the link 210 and the link 220 or 222 would be replaced by a direct cable connection between that printer 300 or 310 and the input/output interface 110. In general, the links 152, 162, 210, 220 and 222 can be any known or later developed connection system or structure usable to interconnect the various elements described above.

Moreover, while FIG. 2 shows the printers 300 or 310 as elements independent of the general purpose computer 100 being used to select one or more sets of rendering parameter options according to this invention, the general purpose computer 100, the input device 150, the display device 160 and the printer 300 or 310 may be an integrated device, such as a digital copier, a computer having a built-in printer, or any other integrated devices capable of producing a hard copy image output.

As is shown in FIG. 2, the memory 130 contains a number of different memory portions, including a printer definition memory portion 132, a printer driver memory portion 134, an application memory portion 136 and a system memory portion 138. It should be appreciated that the memory 130 can include long-term storage memory, such as hard disks and disk drives, floppy disks and disk drives, CD-ROM disks and disk drives, and the like. The memory 130 can also include non-volatile memory such as read-only memory, flash memory and the like. Finally, the memory 130 can include alterable memory, which is usually random access memory, but can be any other known or later developed type of alterable memory.

The system memory portion 130 includes the system programs and drivers that provide the basic input/output and operating system functions for the general purpose computer 100. The application memory portion 136 includes any currently executing programs, such as internet or other document browsers, word processing programs, graphics programs and the like that the user can use to open new files or stored files and to send the contents of the opened files to one of the printers 300 or 310. The printer driver memory portion 134 stores printer drivers for the particular ones of the printers 300 and the like that the user can direct print jobs to through the printer server 200. In particular, according to the systems, methods and graphical user interfaces of this invention, the printer driver memory 134 stores printer drivers that allow multiple virtual printers to be defined for a single meta-printer, such as one of the printers 300 or 310 and that interact with the display device output interface 140, under control of the processor 120, to display on the display device 160 the graphical user interfaces according to this invention. Similarly, the printer drivers stored in the printer driver memory portion 134 allow users to provide user inputs via the input device 150 through the input/output interface 110, under control of the processor 120, to the printer drivers.

The printer definition memory portion 134 stores the various virtual printer definitions, including one or more sets of one or more selected rendering parameter options.

In operation, once the user has defined one or more virtual printers and has opened a document that the user wishes to print, the user accesses the printer driver graphical user interface for the currently selected one of the available printers. The user can access the printer driver graphical user interface using any known or later developed method, such as by selecting the appropriate dropdown menu item, clicking the appropriate toolbar button, or the like. The user can then select, or change the selection of, one or more of the previously defined virtual printers for the currently selected meta-printer that the user wishes to use to print the various objects in the currently opened document.

Once the user has selected the particular one or more virtual printers to be used to render the currently opened document, the user inputs a signal to the printer driver through the graphical user interface, usually by selecting the "OK" button, that the printer driver is to output the appropriate signals to the currently selected meta-printer cause that currently selected meta-printer to render the currently opened document.

In particular, the printer driver for the currently selected meta-printer, which is stored in the printer driver memory portion 134, accesses, under control of the processor 120, the appropriate printer definitions for each of the selected virtual printers that are stored in the printer definition memory portion 132. Then, under control of the processor 120, the printer driver stored in the printer driver memory portion 134 communicates with the currently opened document that is stored, along with the appropriate application program for that document, in the application memory portion 136. The printer driver, using the defined virtual printers stored in the printer definition memory portion 132, converts the currently opened document into printer data and printer control commands and outputs the printer data and printer control commands through the input/output interface 110, the links 210 and 220 and the print server 200 to the currently selected meta-printer 300 or 310.

It should be appreciated that, in various exemplary embodiments, either or both of the printer driver and the virtual printer definitions may be stored in the print server 200 and/or the printer 300 rather than the general purpose computer 100. Similarly, it should be appreciated that the printer driver and the various printer definitions may be implemented in firmware and/or hardware on any one of the general purpose computer 100, the print server 200 and/or the various printer 300 and 310. Thus, it should be appreciated that any particular implementation of the printer driver and the virtual printer definitions according to this invention is not critical, such that any particular implementation of the printer driver and the virtual printer definitions is within the scope of this invention.

Figure 3:
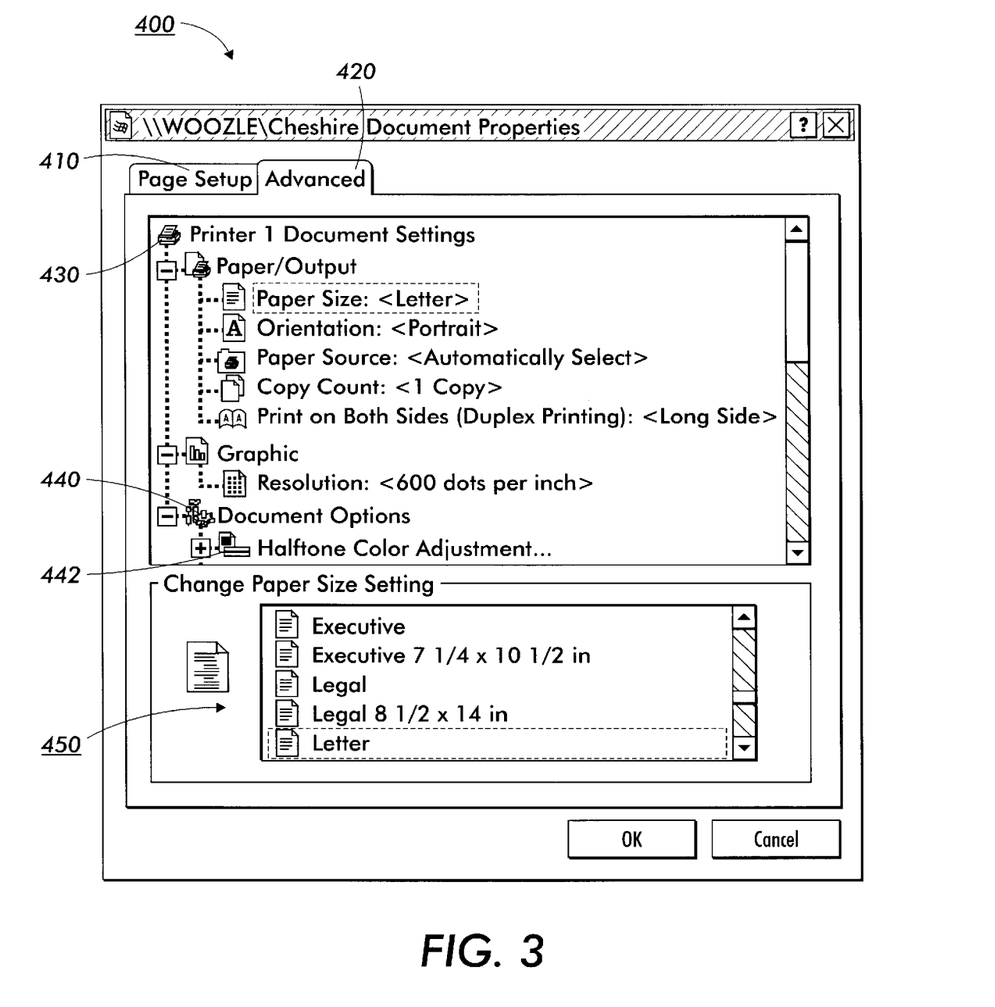
FIG. 3 is a graphical user interface illustrating how to specify the rendering parameter options for a virtual printer.

FIG. 3 is one exemplary embodiment of a graphical user interface for selecting the rendering parameter options according to this invention. As shown in FIG. 3, the graphical user interface 400 includes a page setup portion 410 and an advanced setup portion 420. In particular, the advanced setup portion 420 of the graphical user interface 400 includes a virtual printer definition 430. The virtual printer definition 430 includes various settings to be defined, including the paper output and the graphic resolution, as well as the document rendering options 440. The advanced setup portion 420 of the graphical user interface 440 also includes a paper size selection portion 450. As shown in FIG. 3, one of the document rendering options 440 is the halftone color adjustment rendering parameter 442.

Figure 4:
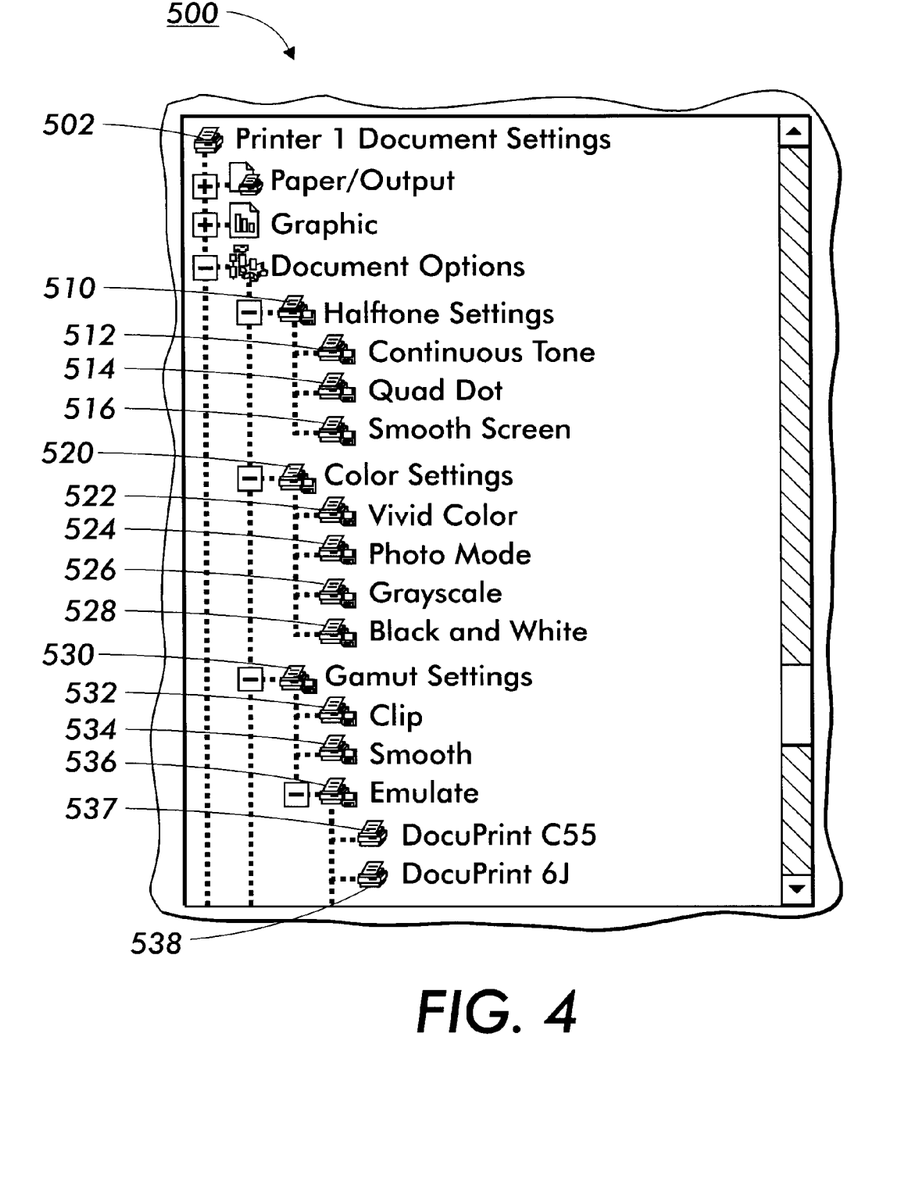
FIG. 4 is a first exemplary embodiment of a portion of the document options portion of the graphical user interface shown in FIG. 3 illustrating an exemplary set of rendering parameters and the options within each such parameter.

FIG. 4 shows in greater detail one exemplary embodiment of a document rendering parameter options portion 500 that corresponds to the document options portion 440 of the graphical user interface 400 shown in FIG. 3. As shown in FIG. 4, for an arbitrary virtual printer "printer 1" 502, the document rendering parameter options portion 500 includes a halftone settings portion 510, a color settings portion 520, a gamut settings portion 530 and the like. In particular, the halftone settings portion 510 includes, as the halftone rendering options, a continuous tone halftone rendering option 512, a quad dot halftone rendering option 514 and a smooth screen halftone rendering option 516. Similarly, the color settings portion 520 includes, as the color rendering options, a vivid color rendering option 522, a photo color rendering option 524, a gray scale color rendering option 526 and a black and white color rendering option 528. Likewise, the gamut settings portions 530 includes, as the gamut rendering options, a clip gamut rendering option 532, a smooth gamut rendering option 534 and an emulate gamut rendering option 536. In particular, the emulate gamut rendering option 536, if selected, allows the user to select the gamut rendering of one or more different printer types to be emulated. Thus, as shown in FIG. 4, the emulate rendering option 536 has a DocuPrint C55 gamut emulation option 537 and a DocuPrint 6J gamut emulation option 538.

In operation, to define the rendering options for the virtual printer "printer 1" 502, the user selects one of the different rendering parameter options for each of the different rendering parameters. It should be appreciated that, if the user does not explicitly select a particular rendering parameter option, a default rendering parameter option for that rendering parameter can be used.

It should further be appreciated that the exemplary embodiment of the document rendering option portion 500 shown in FIG. 4 is particularly useful for selecting the rendering options to be applied by the virtual printer 502 to all of the objects of the document to be printer, regardless of type. Once all of the various rendering parameter options are selected for the one or more different image object types defined in each virtual printer, the user can then access a graphical user interface that allows the user to select a particular virtual printer to be used when printing the documents to be printed.

Figure 5:
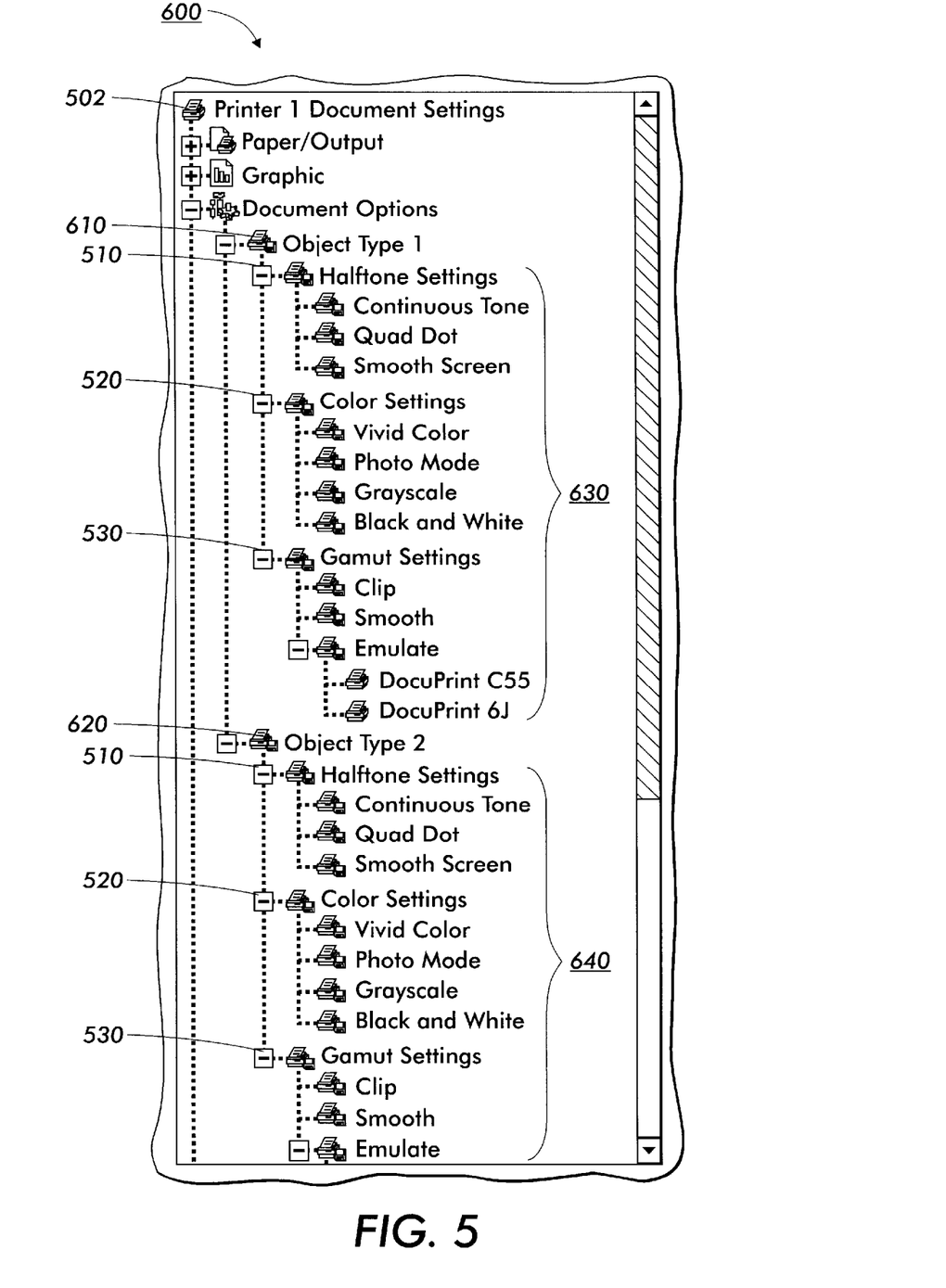
FIG. 5 is a second exemplary embodiment of a portion of the document options portion of the graphical user interface shown in FIG. 3.

FIG. 5 illustrates a second exemplary embodiment of a document rendering parameter options selection portion 600. As shown in FIG. 5, the document rendering parameter options selection portion 600 corresponds to the document type rendering parameter options selection portion 500 shown in FIG. 4. However, the document type rendering parameter options selection portion 600 allows rendering parameter options to be defined for more than one object in a single virtual printer definition. That is, as shown in FIG. 5, if a particular virtual printer will provide rendering parameters for more than one object type, one set of the various document rendering parameter portions 510, 520, 530 and the like can be provided for each such object type 610 and 620 for that virtual printer.

In particular, in the exemplary embodiment of the document type rendering parameter options selection portion 600 shown in FIG. 5, a first set 630 of the various document rendering parameter portions 510, 520, 530 and the like are defined for a first object type 610. Then, a second set 640 of the various document rendering parameter portions 510, 520, 530 and the like are defined for a second object type 620. It should be appreciated that, if the rendering parameter options for more than two different object types are to be defined, additional sets of the various document rendering parameter portions 510, 520, 530 and the like can be provided in the document type rendering parameter options selection portion 600.

The user thus selects, for each implemented virtual printer, the various rendering parameter options to be used to render each of the one or more different image object types associated with that virtual printer using a document type rendering parameter options selection portion, such as the document type rendering parameter options selection portions 500 and 600 shown in FIGS. 4 and 5. Then, the user can access a virtual printer selection graphical user interface to select a particular virtual printer to be used when rendering any documents subsequently selected for printing.

Figure 6:
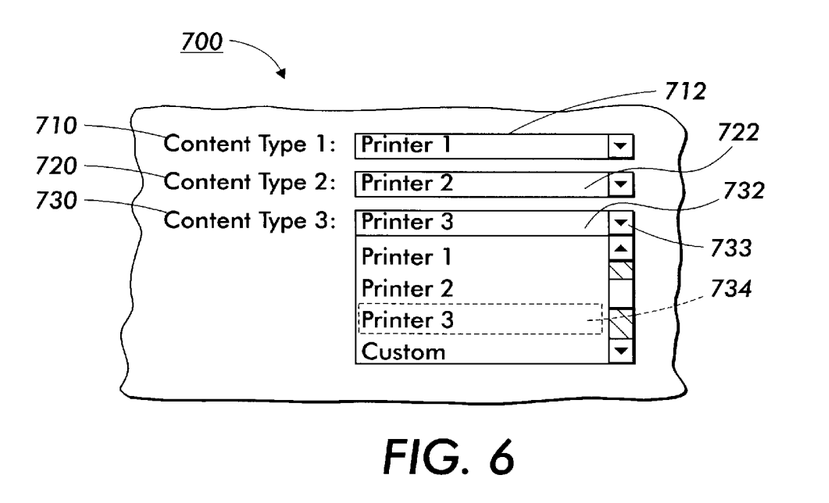
FIG. 6 is an exemplary embodiment of a portion of a dialog box of a second exemplary embodiment of a virtual printer selection graphical user interface for selecting a virtual printer according to this invention.

Additionally, as shown in FIG. 6, in another exemplary embodiment of the systems, methods and graphical user interfaces of this invention, a virtual printer selection graphical user interface can display each of the different types of image objects. In response, the user can associate a particular virtual printer with each one of the different types of image objects.

Thus, in the exemplary virtual printer selection graphical user interface 700 shown in FIG. 6, for a particular first content type 710, a particular virtual printer, such as the virtual printer "printer 1", can be identified in the virtual printer selection dialog box 712. Similarly, for the second and third content types 720 and 730, a particular virtual printer can be identified in the virtual printer selection dialog boxes 722 and 732. For example, to select the virtual printer "printer 3" in the virtual printer selection dialog box 732, a dropdown control 733 can be selected to display the dialog box 734. In the dialog box 734, each of the virtual printers, i.e., "printer 1", "printer 2", "printer 3", and "custom", that have been defined for the particular currently selected meta-printer are displayed. The user than selects one of these virtual printers, which will then be used to render the image objects having an image content type corresponding to the image content type 730.

It should be appreciated that the content types 710–730 can be object types, as discussed in the incorporated 303 patent. However, the content types 710–730 are not limited to object types. It should further be appreciated that any number of content types can be implemented in the virtual printer selection graphical user interface 700. Thus, any set of independent types of content into which a document to be printed can be divided can be used as the content types 710 et al.

For example, rather than object types as defined in the 303 patent, the content types could correspond to the various independent document layers of a document resulting from decomposing a document using the mixed raster content (MRC) decomposition technique. U.S. patent application Ser. No. 09/432,600, filed Nov. 3, 1999, incorporated herein by reference in its entirety, discusses decomposing a mixed raster content image into various independent layers. Such layers can include, for example, a background layer, a foreground layer, foreground-default-color layer, and the like.

As shown in FIG. 2, the systems, methods and graphical user interfaces for defining and using virtual printers to select rendering options for different types of image objects is preferably implemented on a general purpose computer 100. However, the systems, methods and graphical user interfaces for defining and using virtual printers to select rendering options for different types of image objects can also be implemented on a special purpose computer, a programmed microprocessor or microcontroller and peripheral integrated circuit elements, and ASIC or other integrated circuit, a digital signal processor, a hard wired electronic or logic circuit such as a discreet element circuit, a programmable logic device such as a PLD, PLA, FPGA or PAL, or the like. In general, any device capable of implementing the systems, methods and graphical user interfaces described above can be used in place of the general purpose computer 100.

Accordingly, it should be understood that each of the elements of the general purpose computer 100, including the printer drivers stored in the printer driver memory portion 134 can be implemented as portions of a suitably programmed general purpose computer. Alternatively, each of these elements shown in FIG. 2 can be implemented as physically distinct hardware circuits within an ASIC, or using a FPGA, a PLD, a PLA, or a PAL, or using discrete logic elements or discreet circuit elements. The particular form of each of the elements shown in FIG. 2 will take is a design choice and will be obvious and predictable to those skilled in the art.

Similarly, it should be understood that the systems, methods and graphical user interfaces described above may be implemented as software executing on any one of the general purpose computer 100, the print server 200 and/or the printer 300 or 310. In general, the systems, methods and graphical user interfaces according to this invention can be implemented as software executing on a programmed general purpose computer, a programmed special purpose computer, a programmed microprocessor, or the like. In this case, the systems, methods and graphical user interfaces according to this invention can be implemented as portions of a printer driver, as resources residing on a print server or the like. Likewise, the systems methods and graphical user interfaces of this invention can also be implemented by physically incorporating them into software and/or hardware systems, such as the hardware and software systems of a printer or a digital photocopier.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for associating a plurality of sets of rendering parameters with at least one document to be printed, comprising:

providing a list of at least one virtual printer, each virtual printer defining a plurality of sets of rendering parameters for rendering a document on a corresponding image output device;

receiving at least one user input selecting at least one virtual printer desired by the user from the list of at least one virtual printer, different portions of the at least one document to be printed being printed using different ones of the plurality of sets of rendering parameters; and associating the plurality of sets of rendering parameters for the at least one selected virtual printer with the at least one document to be printed.

2. The method of claim 1, wherein receiving at least one input selecting at least one virtual printer comprises receiving an input selecting a single virtual printer.

3. The method of claim 2, wherein, when a single virtual printer is selected, associating the plurality of sets of rendering parameters for the at least one selected virtual printer with the at least one document to be printed comprises associating the single selected virtual printer with at least one different content type of the at least one document to be printed.

4. The method of claim 3, wherein each at least one document includes a plurality of different content types.

5. The method of claim 4, wherein the plurality of different content types comprises at least one of object types and mixed raster content layers.

6. A method for associating at least one set of rendering parameters with at least one document to be printed, comprising:

providing a list of at least virtual printer, each virtual printer defining a plurality of sets of rendering parameters for rendering a document on a corresponding image output device;

receiving at least one user input selecting at least one virtual printer desired by the user from the list of at least one virtual printer; and associating at least one set of the plurality of sets of rendering parameters for each selected virtual printer with the at least one document to be printed, wherein:

receiving at least one user input selecting at least one virtual printer comprises receiving a plurality of user inputs selecting a plurality of the virtual printers; and associating the at least one set of rendering parameters for each selected virtual printer with the at least one document to be printed comprises associating each selected virtual printer with at least one different content type of the at least one document to be printed.

7. The method of claim 6, wherein, when each selected virtual printer comprises a single set of rendering parameters, each content type associated with that selected virtual printer is printed using that single set of rendering parameters.

8. The method of claim 6, wherein, when each selected virtual printer comprises a plurality of sets of rendering parameters, each content type associated with that selected virtual printer is printed using a different one of the plurality of sets of rendering parameters.

9. The method of claim 6, wherein each at least one document includes a plurality of different content types.

10. The method of claim 6, wherein the plurality of different content types comprises at least one of object types and mixed raster content layers.

11. The method of claim 1, further comprising:

providing a list of at least one image output device usable to print the at least one document; and receiving an input selecting an image output device to be used to print the at least one document from the list of at least one image output device.

12. The method of claim 11, further comprising printing the different portions of the at least one document on the selected image output device using the different ones of the plurality of associated rendering parameters for each selected virtual printer.

13. The method of claim 11, wherein providing the list of at least one virtual printer comprises providing, for each image output device, a list of at least one virtual printer associated with that image output device.

14. The method of claim 11, wherein the at least one input selecting at least one virtual printer selects the at least one virtual printer from the list of at least one virtual printer for the selected image output device.

15. A method for defining a virtual printer associated with an image output device, comprising:

providing a list of rendering parameters of the image output device;

providing a list of rendering parameter options for each rendering parameter of the list of rendering parameters;

receiving a user input selecting a rendering parameter option for a plurality of rendering parameters of the list of rendering parameters; and associating, for each at least one rendering parameter, the selected rendering parameter option with that rendering parameter for the virtual printer, wherein different portions of at least one document to be printed are printed using different rendering parameters.

16. The method of claim 15, further comprising, for any rendering parameter for which an input was not received, associating a default rendering parameter option with each such rendering parameter for that virtual printer.

17. A graphical user interface usable to associate at least one virtual printer with an image output device usable to output an image of a document, comprising:

an image output device selection portion usable to select an image output device to be used to output images of documents; and a virtual printer selection portion usable to select at least one virtual printer associated with the selected image output device, each selected virtual printer defining a plurality of sets of rendering parameters for rendering a document on a corresponding image output device and each selected virtual printer to be used to render at least a portion of the document to be output using the selected image output device.

18. The graphical user interface of claim 17, wherein the virtual printer selection portion comprises a plurality of content portions corresponding to different content types of documents that can be rendered using the selected image output device, each content portion comprising a virtual printer selection subportion for selecting a virtual printer to be used to render the content type corresponding to that content portion.

19. A graphical user interface usable to associate various rendering parameter options for various rendering parameters with a virtual printer of an image output device, comprising:

a virtual printer portion identifying a particular virtual printer of the image output device for which a plurality of rendering parameter options is to be associated;

at least one rendering parameter portion that indicates a plurality of rendering parameters of the image output device; and at least one rendering parameter option portion that indicates a plurality of rendering parameter options for at least one of the plurality of rendering parameters indicated in the rendering parameter portion;

wherein:

each rendering parameter of the at least one rendering parameter portion is selectable to display the corresponding rendering parameter options; and each rendering parameter option of the at least one rendering parameter option portion is selectable to associate that rendering parameter option with the particular virtual printer identified in the virtual printer portion.

20. The graphical user interface of claim 19, further comprising a plurality of document content portions, each document content portion comprising at least one of the at least one rendering parameter portion and at least one rendering parameter option portion corresponding to the at least one rendering parameter portion.

21. A method for determining the rendering parameters of a print engine of an image output device, comprising:

providing at least one virtual printer, each virtual printer defining a plurality of sets of rendering parameters;

receiving at least one user input for a document, selecting one of the at least one virtual printer; and associating at least two of the plurality of sets of rendering parameters of the selected virtual printer with the image output device;

wherein a first portion of the document will be output using one of the at least two of the plurality of sets of rendering parameters, a second portion of the document will be output using another of the at least two of the plurality of sets of rendering parameters, and the first and second portions will be output on the print engine.

22. A method for defining a virtual printer associated with a print engine of an image output device, comprising:

providing the rendering parameters supported by the print engine;

providing the rendering parameter options for each supported rendering parameter, receiving a user input selecting a plurality of rendering parameter option for a plurality of the supported rendering parameters; and associating the plurality of rendering parameter options with the print engine;

wherein whenever the virtual printer is selected, the document will be output on the print engine according to the plurality of rendering parameter options.

23. A graphical user interface usable to associate at least one virtual printer with an image output device usable to output an image of a document, comprising:

an image output device selection portion usable to select a print engine to be used to output images; and a virtual printer selection portion usable to select at least one virtual printer associated with the selected print engine, each selected virtual printer associates a first portion of the document with a first set of rendering parameters and associates a second portion of the document with a second of rendering parameters.

24. A graphical user interface usable to associate various rendering parameter options for various rendering parameters with a virtual printer of an image output device, comprising:

a virtual printer portion identifying a particular virtual printer of the image output device for which at least one rendering parameter option is to be associated;

at least one rendering parameter portion that indicates at least one rendering parameter of a print engine; and at least one rendering parameter option portion that indicates at least one rendering parameter option for at least one of the rendering parameters of the print engine indicated in the rendering parameter portion;

wherein:

each at least one rendering parameter of the at least one rendering parameter portion is selectable to display the corresponding rendering parameter options; and each at least one rendering parameter option of the at least one rendering parameter option portion is selectable to associate that rendering parameter option of the print engine with the particular virtual printer identified in the virtual printer portion; and each identified virtual printer is to be used to output a portion of a document according to a first set of rendering parameters and another portion of the document to be output using a second set of rendering parameters on the print engine.

* * * * *